(12) United States Patent
Gilg

(10) Patent No.: US 7,790,091 B2
(45) Date of Patent: Sep. 7, 2010

(54) DEVICE AND METHOD FOR PRODUCING OBJECTS MOLDED FROM PASTE-LIKE MOLDED MATERIALS, AND PRODUCTION MOLD

(75) Inventor: Franz Xaver Gilg, Polling (DE)

(73) Assignee: Weckerle GmbH, Weilhelm (DE)

( * ) Notice: Subject to any disclaimer, the term of this patent is extended or adjusted under 35 U.S.C. 154(b) by 1309 days.

(21) Appl. No.: 10/556,667

(22) PCT Filed: May 13, 2004

(86) PCT No.: PCT/EP2004/005134

§ 371 (c)(1),
(2), (4) Date: Nov. 14, 2005

(87) PCT Pub. No.: WO2004/100705

PCT Pub. Date: Nov. 25, 2004

(65) Prior Publication Data

US 2007/0023964 A1 Feb. 1, 2007

(30) Foreign Application Priority Data

May 13, 2003 (DE) .................................. 103 21 485

(51) Int. Cl.
*B29C 33/50* (2006.01)
(52) U.S. Cl. ...................... 264/334; 264/138; 425/441; 425/444; 425/DIG. 32
(58) Field of Classification Search ................ 425/444, 425/DIG. 32, 441; 264/138, 334
See application file for complete search history.

(56) References Cited

U.S. PATENT DOCUMENTS 2,263,302 A * 11/1941 Johnson ...................... 425/507
3,493,309 A * 2/1970 Grisel ........................... 401/78
2002/0086079 A1 7/2002 Kuo
2004/0137101 A1 * 7/2004 Avalle ......................... 425/117

FOREIGN PATENT DOCUMENTS

| DE | 900544 | * | 7/1949 |
| DE | 101 36 391 A | | 2/2003 |
| EP | 0 686 468 A | | 12/1995 |
| FR | 2 729 278 A | | 7/1996 |

OTHER PUBLICATIONS

PCT/WO2004/100705 A1 International Search Report Nov. 25, 2004.

* cited by examiner

*Primary Examiner*—Yogendra N Gupta
*Assistant Examiner*—Emmanuel S Luk
(74) *Attorney, Agent, or Firm*—Howard & Howard Attorneys PLLC

(57) ABSTRACT

The invention relates to a device and a method for producing objects, for example lipsticks, that are molded from paste-like materials, while using an elastic mold part (28), into which the paste-like material is introduced by means of a filling device, is hardened, and from which the at least largely hardened object is removed by a removing device while said mold part is elastically stretched. It is provided a dimensionally stable housing element (12) for housing said mold part, wherein said housing element is held inside a stationary or moveable support of said device, wherein said mold part (28) is placed in a housing space of said housing element at least during the filling and removal process, and wherein said housing space can be enlarged for removing the object and/or a thin fluid layer is placed between said mold part and said housing element, which is removable from said housing element for the removal process. Such a production mold prevents/limits the stretching of said mold part during filling and consequently the production tolerances of the end product. The invention also relates to a production mold for such a device.

31 Claims, 2 Drawing Sheets

DEVICE AND METHOD FOR PRODUCING OBJECTS MOLDED FROM PASTE-LIKE MOLDED MATERIALS, AND PRODUCTION MOLD

This application claims priority to Patent Cooperative Treaty Application Serial No. PCT/EP2004/005134, filed May 13, 2004, which claims priority to German Application Serial No. 10321485.2, filed May 13, 2003.

BACKGROUND OF THE INVENTION

1. Field of the Invention

The invention relates to a device for producing objects that are molded from paste-like materials as, for example, lipsticks.

2. Description of the Related Art

Such a device is, for example, shown in FR 2 729 278. According to this document, silicone molds are provided which are freely suspended top down in a support of a filling device. The material is filled in hot, and hardens in the mold. After hardening, a small basket is applied from top, this means at the lipstick's rear end, and a vacuum is applied on the outer surface of the silicone mold, whereby it expands and releases the lipstick body formed in its interior. Subsequently, the lipstick can be removed towards the top by means of the small basket. A problem of this method is that the silicone mold looses its dimensional stability, in particular if used longer, since, among others the mold is deformed with every production process for removing the lipstick. On the other hand, this very deformation offers the possibility of removing the hardened lipstick from the mold with little effort.

Therefore, it is the problem of the invention to provide a device for producing objects made of paste-like materials, which—on the one hand—ensures the high dimensional stability of the product, and—on the other hand—ensures the object's easy removability from the mold after hardening.

SUMMARY OF THE INVENTION AND ADVANTAGES

This problem is solved by a device with the features of claim 1, a production mold according to claim 13, and a method according to claim 15. Advantageous further developments of the invention are the subject matter of the respective dependent claims.

According to the invention, a mold is provided in which an elastic mold part, for example made of silicone, is used not freely suspended, but the mold part is arranged in a dimensionally stable housing element, ensuring that the mold part is not deformed at least during the filling process. To this end, the housing element has a housing space, in which the mold part abuts on housing element's inner walls either directly or with interposition of a thin fluid layer. This ensures that the mold part does not alter when the paste-like material is filled in, but maintains its original shape (in unfilled state). This causes that during the production of objects, for example lipsticks, made of paste-like materials by far lesser production tolerances occur than this is the case with known methods. It is not required that the mold part abuts on the housing element with its entire surface, but that those surfaces, which are decisive for the object's dimensional stability, abut on the housing element, such as, for example, the coat portion of a lipstick.

Discharge of the mold is done in that a movable part of the housing element is made movable such that the housing space for housing the mold part is enlarged when the movable part is moved. Thus, the walls of the mold part are stretched in a defined manner, and thereby are moved away from the hardened paste-like material. The hardened object can now be removed from the mold part—in the case of lipstick production, for example by means of a plugged-on small basket. The advantage generated by the movable part of the housing element is that the housing space is only enlarged by a defined value, which also entails a only defined deformation of the mold part. During removal, the mold part is thus not stretched in an undefined manner and possibly overstretched, which would result in a decrease of the dimensional stability of the mold part. Instead of or in addition to the movement of the movable part, a thin fluid layer, such as for example air or water, respectively an oil layer, may be provided between the mold part and the housing element. A defined slight enlargement of the mold part can then be achieved if the fluid is removed from this gap, for example by moving the movable part. The mold part is herein slightly expanded by a small defined value, which enables the formed object's removal from the mold part, but on the other hand prevents an overstretching of the mold part during removal. All kinds of gaseous, liquid or viscous, yet flowable materials can be used as fluid. It is essential that the existing fluid volume is closed so that a vacuum acts upon the walls of the mold part if the movable part is moved away from the mold part. Naturally, it is likewise possible to enlarge the housing space via the movable part and only thereafter to stretch the mold part by application of a vacuum.

Preferably, the external wall of the mold part is made in the shape of a cone, whereas the corresponding moveable part of the housing element is made in the shape of a cone-shaped recess, which is axially movable away from the mold part. The vacuum caused thereby causes that the mold part is slightly stretched. Since preferably a block element is provided for the movement of the movable part, the maximum degree of deformation of the mold part is defined for the removal of the hardened object; in the case of adjustable block elements, it even is adjustable. The block element can be adjusted such that the best compromise between easy removal and little stretching of the mold part is achieved. Preferably, the housing element for the mold part is made of metal and, together with it, forms a mold which can be inserted like a common conventional lipstick mold in a conventional production machine, such as a revolving-cycle lipstick pouring-machine. To this end, the housing element preferably comprises in its upper and external range standardized adapter surfaces, for example in the shape of flanges or cantilevers.

Preferably, the elastic mold is made of silicone. However, it can also be made of arbitrary other elastic materials such as different kinds of rubber and plastic, which have a high elasticity with a reversible stretching over 10%, preferably over 30%, and which are chemically insensitive against the objects to be produced.

In the following, the invention is described in the schematic drawing by way of an example.

DETAILED DESCRIPTION OF THE INVENTION

The figures show a mold 10, which can, for example, be used in a stationary or moving support of a lipstick filling machine. Such a lipstick filling machine (not shown), which is, for example, represented by revolving-cycle machines, comprises a filling device, filling a warm liquid paste-like material into a mold, the paste-like material hardens in the mold, and a removing device removes the thus formed lipstick by means of a small basket, pressed onto the hardened material from the top, which is generally the small support basket used in the lipstick. When the lipstick is removed by the small basket, the mold part is slightly expanded, so that the formed lipstick is easily released.

Figure 1:
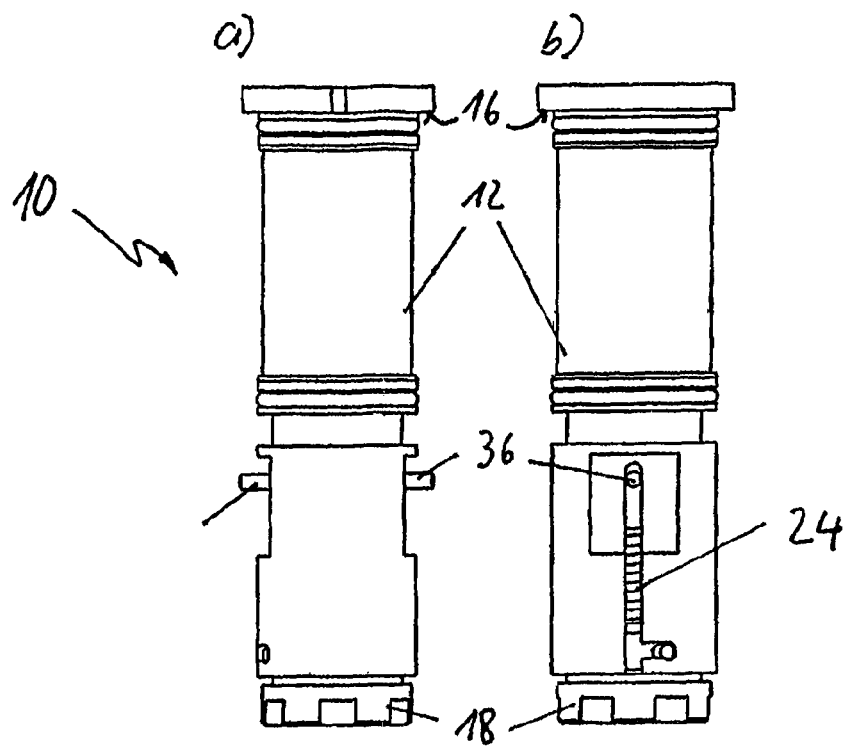
FIGS. 1 a and b show a lateral view of a mold with inserted mold for producing a lipstick in two lateral views, at 90° offset.
Figure 2:
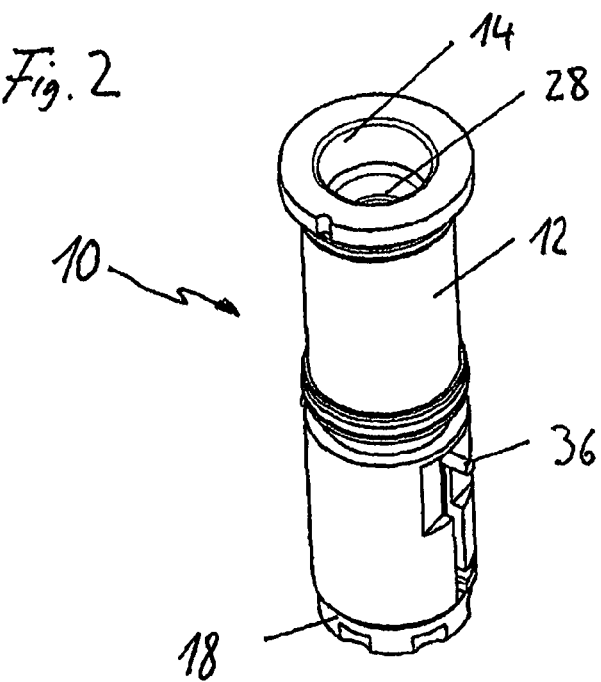
FIG. 2 shows a perspective view of the mold of FIG. 1 diagonally from above.
Figure 3:
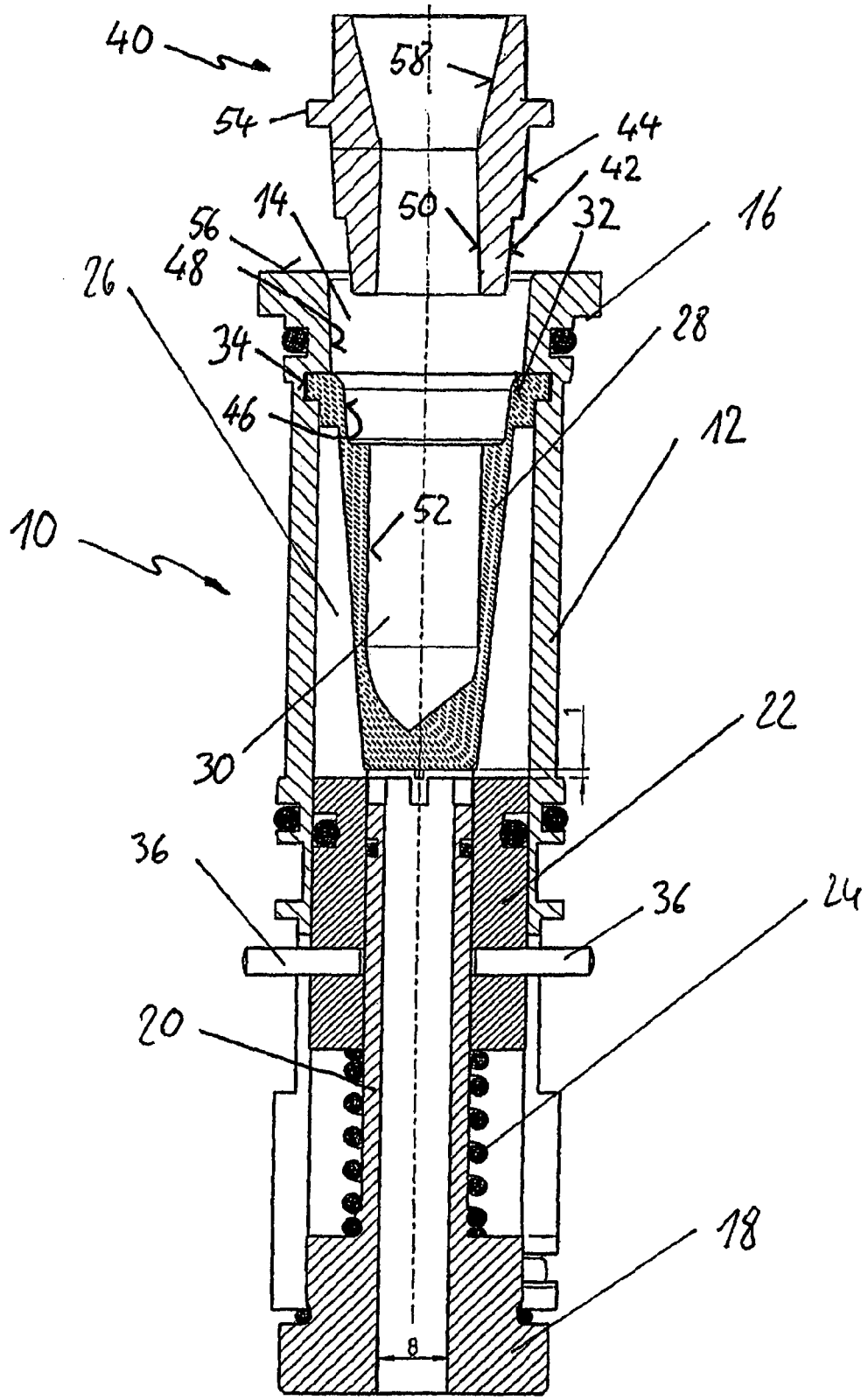
FIG. 3 shows an enlarged section of the mold of FIG. 1 in longitudinal section.

Such a mold is the mold 10, which is shown in FIGS. 1 to 3. Mold 10 comprises an external, sheath-like stabile housing element 12, which has a filling aperture at its upper end 14. The upper end has a cantilever 16 protruding to the outside, for inserting the mold 10 into the support of a lipstick filling machine. The stabile mold part consists of metal, in particular aluminum or other light-metal alloys, and has a bottom part 18, from which a centering thorn 20 extends vertically upwards. An axially movable release element 22 is supported on this thorn, which is pressed into a first illustrated filling position by means of a spring 24, supported against the bottom part 18 of the mold part 12. In said filling position, an inner cone 26, which is arranged at the upper end of the movable release element 22, abuts the external wall of an elastic mold part 28 in a planar fashion, said elastic mold part preferably consisting of silicone, into the interior space 30 of which the paste-like material is introduced for forming the lipstick. The mold part 28 is fixed in an inner groove 34 of the housing element 12 by means of a cantilever 32. To move the movable release element 22, 26 downwards against the force of the spring 24, an actuating stud 36 is provided, running transversely to the axis, which can be actuated downwards into a release position of the upper cone by an actuation organ (not shown) of a lipstick filling machine, by means of which the elastic mold part 28 is stretched due to the low pressure generated when the inner cone is moved downwards, which in turn allows to remove the hardened lipstick material in the mold part 28 from the mold 10 by means of a small basket upwardly through the aperture 14. To ensure a smooth function, the external wall of the elastic mold part 28 does not have to completely abut on the inner cone 26. It is also possible to arrange a thin fluid layer, for example an air layer or a liquid layer, such as water or oil layer, between the inner cone 26 and the external wall of the mold part 28; when the actuation stud 36 is actuated downwards, the thin fluid layer causes that the elastic mold part is correspondingly stretched due to the occurrence of the vacuum when the inner cone 26 is pulled down. This in turn causes the release of the lipstick formed in the inner space 30 of the mold part 28. Of course, a low pressure can also be applied to the gap between the mold part 28 and the housing element 12 by actuating the release element into the release position.

To fill the mold part 18, a filling piece 40, in particular made of metal, is provided, which can be plugged onto the upper end 14 of the housing element 12. The filling piece 40 is formed as a hollow cylinder, the inner wall 50 of which has at the lower end of the filling piece 40 exactly the same diameter as the inner diameter 52 of the cylindrical part of the mold part 18. In an upper section 58, the inner diameter is slightly expanded in a funnel-like manner. From bottom to top, the mold part has at its external circumference two superimposed cone-shaped circumferential surfaces 42, 44. An orbital shoulder 54 is formed at the upper edge of the upper cone-shaped circumferential surface 44.

This filling piece 40 is pressed or plugged onto the housing element prior to filling, until its shoulder 54 abuts on the upper side 56 of the housing element 12. Then, the external circumferential surfaces 42, 44 abut on a corresponding inner cone 46 of the mold part 18 and on a corresponding inner cone 48 of the housing element 12, and thus securely seal the upper portion of the mold 10 between the housing element 12 and the mold part 18. At this, the inner wall 50 of the filling piece 40 is in alignment with the inner diameter 52 of the mold part 18. The mold 10 is filled until the material slightly projects into the filling piece 40. After hardening of the material, the filling piece 40 is now pulled off towards the top, which is eased since the inner wall 50 is slightly cone-shaped extended in the lower direction. Then, the small basket for removal of the object is pressed onto the material pin protruding upwardly from the mold part. Due to the fact that the circumference of the material portion for housing the small basket is defined by the exactly defined inner diameter of the inner wall 50 of the filling piece 40, the elastic mold part does not introduce any tolerances into production.

Of course, the actuation of the actuation stud 36 does not have to be centrally controlled by the lipstick machine, but can be coupled mechanically by the removing device alone, for example in coordination with plugging the small basket onto the hardened lipstick material.

The dimensionally stable part of the housing element, in particular the inner cone 26 consists of any dimensionally stable material, such as metal, ceramic, or plastic, whereas the elastic mold part can consist of any kind of a rubber-elastic material with an elastic expansibility of at least 10%, in particular silicone, latex, or other highly-elastic polymers.

The housing space of the housing element for the mold part is preferably provided in the inner space of the housing element. Like in the drawings, the housing element may be made as rotation-cylindrical body, in which, for example, the movable part is axially movable. However, bodies with different shapes, for example with quadratic or polygonal base surface are also conceivable.

Of course, a thin fluid layer may also be arranged in the relaxed state between the mold part 18 and the cone surface, respectively inner cone 26, which can optimally stabilize the silicone mold (mold part 18).

The invention claimed is:

1. A device for producing objects, for example lipsticks, that are molded from paste-like materials, while using an elastic mold part, into which the paste-like material is introduced by a filling device, is hardened, and from which the at least largely hardened object is removed by a removing device while said mold part is elastically stretched, comprising:

a dimensionally stable housing element is provided for housing said mold part, wherein said housing element is held inside a stationary or moveable support of said device, wherein said mold part is placed in a housing space of said housing element at least during the filling and removal process, and wherein said housing space can be enlarged by moving a moveable, dimensionally stable part of said housing element and the elastic mold part is stretchable by generating a low pressure in said housing space for removing the object.

2. The device according to claim 1, wherein during the filling process a thin fluid layer is placed between said mold part and said housing element, which is removable from said housing element for the removal process.

3. The device according to claim 1, wherein said fluid layer has a thickness of at most 5 mm, preferably at most 2 mm.

4. The device according to claim 1, wherein a coat portion of said mold part at least predominantly, preferably completely abuts in a planar fashion on said housing element.

5. The device according to claim 1, wherein said housing element comprises a release element which is movable in relation to said mold in a planar fashion.

6. The device according to claim 5, wherein the path of said movable release element is in its end positions limited by block elements.

7. The device according to claim 5, wherein between said mold part and said movable release element a closed gas, respectively fluid volume is arranged to form a thin fluid layer.

8. The device according to claim 5, wherein an actuation element is provided which, controlled by a control element of said device or by a removing device, actuates the movable part of said housing element during the removal process and/or sucks said fluid off the gap between said mold part and said housing element.

9. The device according to claim 1, wherein the side of said mold part which faces said housing element has the shape of a cone, and that said housing element is formed as complementary cone-shaped recess.

10. The device according to claim 1, wherein said housing element is made of metal, in particular of aluminum.

11. The device according to claim 1, wherein said mold part is made of silicone.

12. The device according to claim 1, wherein said mold part comprises a flange at its upper filling end, which is fixed in said housing element.

13. The device according to claim 1, wherein said housing element comprises a standardized adapter to be housed in a traditional revolving-cycle lipstick pouring machine.

14. A production mold for producing objects, for example lipsticks, that are molded from paste-like materials, in particular for a device, comprising: an elastic mold part for housing the paste-like material,
a dimensionally stable housing element for housing the elastic mold part, wherein said housing element is formed to be housed inside a stationary or moveable support of a production machine for objects made of paste-like materials,
wherein said mold part is placed in a housing space of said housing element, and
wherein said housing space can be enlarged by moving a moveable, dimensionally stable part of said housing element and the elastic mold part is stretchable by generating a low pressure in said housing space for removing the object.

15. The production mold according to claim 14, wherein during the filling process a thin fluid layer is placed between said mold part and said housing element, which is removable from the gap between said mold part and said housing element for the removal process.

16. The production mold according to claim 14, wherein a dimensionally stable, hollow-cylindrical filling element, for example made of metal, is provided, which can be placed onto said housing element, respectively onto said mold part, and the inner wall of which forms the mold for an end section of said object.

17. A method for producing objects, for example lipsticks, that are molded from paste-like materials, while using an elastic mold part, into which the paste-like material is introduced, hardened, and from which the at least largely hardened object is removed while said mold part is elastically stretched, comprising the steps of:
said mold part is placed in a housing space of a dimensionally stable housing element during the filling and removal process in order to prevent/limit the stretching of said mold part, and that for stretching said mold part for the removal process said housing space is enlarged by moving a moveable, dimensionally stable part of said housing element and a low pressure is generated in said housing space to stretch the elastic mold part for removing the object.

18. The method according to claim 17, wherein during the filling process a thin fluid layer is provided between said mold part and said housing element, having a maximum thickness of 5 mm, preferably of maximally 2 mm, said fluid layer is removed from the gap for the removal process in order to generate a vacuum acting upon the external wall of said mold part.

19. The Method according to claim 17, wherein said mold part at least predominantly abuts the housing element during the filling process.

20. A device for producing objects, for example lipsticks, that are molded from paste-like materials, while using an elastic mold part, into which the paste-like material is introduced by a filling device, is hardened, and from which the at least largely hardened object is removed by a removing device while said mold part is elastically stretched, comprising:
a dimensionally stable housing element for housing said mold part, wherein said housing element is held inside a stationary or moveable support of said device,
wherein said mold part is placeable in a housing space of said housing element at least during the filling and removal process,
wherein during the filling process a thin fluid layer is placed between said mold part and said housing element, which is removable from said housing element for the removal process, and
wherein said housing space can be enlarged by moving a moveable, dimensionally stable part of said housing element and the elastic mold part is stretchable by generating a low pressure in said housing space for removing the object.

21. The device according to claim 20, wherein said fluid layer has a thickness of at most 5 mm, preferably at most 2 mm.

22. The device according to claim 20, wherein said housing element comprises a release element which is movable in relation to said mold and wherein between said mold part and said movable release element a closed gas, respectively fluid volume is arranged to form the thin fluid layer.

23. The device according to claim 20, wherein an actuation element is provided which, controlled by a control element of said device or by a removing device, sucks said fluid off the gap between said mold part (28) and said housing element (12).

24. The device according to claim 20, wherein the side of said mold part which faces said housing element has the shape of a cone, and that said housing element is formed as complementary cone-shaped recess.

25. A device according to claim 20, wherein said housing element is made of metal, in particular of aluminum.

26. The device according to claim 20, wherein said mold part is made of silicone.

27. The device according to claim 20, wherein said mold part comprises a flange at its upper filling end, which is fixed in said housing element.

28. The device according to claim 20, wherein said housing element comprises a standardized adapter to be housed in a traditional revolving-cycle lipstick pouring machine.

29. A production mold for producing objects, for example lipsticks, that are molded from paste-like materials, comprising:

an elastic mold part for housing the paste-like material, a dimensionally stable housing element for housing the elastic mold part, wherein said housing element is formed to be housed inside a stationary or moveable support of a production machine for objects made of paste-like materials, wherein said mold part is placed in a housing space of said housing element, and wherein during the filling process a thin fluid layer is placed between said mold part and said housing element, which is removable from the gap between said mold part and said housing element for the removal process, and wherein said housing space can be enlarged by moving a moveable, dimensionally stable part of said housing element and the elastic mold part is stretchable by generating a low pressure in said housing space for removing the object.

30. The production mold according to claim 29, wherein the dimensionally stable part is a hollow-cylindrical filling element, for example made of metal, which can be placed onto said housing element, respectively onto said mold part, and the inner wall of which forms the mold for an end section of said object.

31. A method for producing objects, for example lipsticks, that are molded from paste-like materials, while using an elastic mold part, into which the paste-like material is introduced, hardened, and from which the at least largely hardened object is removed while said mold part is elastically stretched, comprising the steps of:

placing said mold part in a housing space of a dimensionally stable housing element during the filling and removal process in order to prevent/limit the stretching of said mold part, and that during the filling process a thin fluid layer is provided in the housing space between said mold part and said housing element, having a maximum thickness of 5 mm, preferably of maximally 2 mm, said fluid layer is removed from between said mold part and said housing element for the removal process in order to generate a vacuum acting upon and stretching the external wall of said mold part, and said housing space is enlarged by moving a moveable, dimensionally stable part of said housing element for removing the object.

* * * * *